US012683885B2

(12) United States Patent
Chen et al.

(10) Patent No.: US 12,683,885 B2
(45) Date of Patent: Jul. 14, 2026

(54) TEST SYSTEM AND TEST METHOD FOR TIME-SENSITIVE NETWORKING DEVICE

(71) Applicant: SHANGHAI JIAO TONG UNIVERSITY, Shanghai (CN)

(72) Inventors: Cailian Chen, Shanghai (CN); Qimin Xu, Shanghai (CN); Xuanzhao Lu, Shanghai (CN); Xinping Guan, Shanghai (CN); Jinglong Zhang, Shanghai (CN); Shanying Zhu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 338 days.

(21) Appl. No.: 18/229,396

(22) Filed: Aug. 2, 2023

(65) Prior Publication Data

US 2023/0379236 A1     Nov. 23, 2023

Related U.S. Application Data

(63) Continuation-in-part    of    application    No. PCT/CN2022/073908, filed on Jan. 26, 2022.

(30) Foreign Application Priority Data

Feb. 3, 2021    (CN) .......................... 202110151950.4

(51) Int. Cl.
*H04L 43/50*          (2022.01)
*H04L 43/06*          (2022.01)
(52) U.S. Cl.
CPC .............. *H04L 43/50* (2013.01); *H04L 43/06* (2013.01)
(58) Field of Classification Search
CPC ................................ H04L 43/50; H04L 43/06
See application file for complete search history.

(56) References Cited

U.S. PATENT DOCUMENTS 10,084,657 B2 *   9/2018   Shevenell ............... H04L 41/40
10,680,889 B2 *   6/2020   Vasseur ............... H04L 41/0816
(Continued)

FOREIGN PATENT DOCUMENTS

CN          1750485 A        3/2006
CN          1889600 A        1/2007
(Continued)

OTHER PUBLICATIONS

ISR and Written Opinion of PCT/CN2022/073908, dated Mar. 29, 2022 (in Chinese with English translation) (12 pages).

*Primary Examiner* — Chandrahas B Patel
(74) *Attorney, Agent, or Firm* — Fitch, Even, Tabin & Flannery LLP

(57)          ABSTRACT

A test method for a time-sensitive networking device, including steps of: sending a test request and a test goal; converting the test goal into test information; making a determination on a test scenario including a field test and a simulation test; determining whether feedback information is received from the networking device under test within a test duration; in case of the reception, testing the feedback information and outputting a test result. A test system for a time-sensitive networking device, including a networking device testing apparatus, a user terminal and a plurality of networking devices under test. One terminal of the networking device testing apparatus is connected to the user terminal, and another terminal is connected to the plurality of networking devices under test. The networking device testing apparatus includes a power supply, a processing unit, a storage unit, a network interface and a clock module.

19 Claims, 5 Drawing Sheets

(56)                References Cited

U.S. PATENT DOCUMENTS

| | | | |
|---|---|---|---|
| 11,252,021 B2 * | 2/2022 | Estrada | .............. H04L 41/0631 |
| 2018/0309655 A1 | 10/2018 | Joseph | |
| 2019/0258753 A1 | 8/2019 | Minwalla | |

FOREIGN PATENT DOCUMENTS

| | | | |
|---|---|---|---|
| CN | 103034231 A | 4/2013 | |
| CN | 103982413 A | 8/2014 | |
| CN | 108322356 A | 7/2018 | |
| CN | 108737003 A | 11/2018 | |
| CN | 109218139 A | 1/2019 | |
| CN | 109361562 A | 2/2019 | |
| CN | 110166312 A | 8/2019 | |
| CN | 209964076 U | 1/2020 | |
| CN | 111416752 A | 7/2020 | |
| CN | 111585836 A | 8/2020 | |
| CN | 112311623 A | 2/2021 | |
| CN | 112804124 A | 5/2021 | |
| IN | 104053164 A | 9/2014 | |
| WO | 2022166694 A1 | 8/2022 | |

* cited by examiner

Human-Machine Interactions

User Terminal

Networking Device Testing

TSN Network

Industrial Ethernet

Field Bus-Based Network

Topology of Networking Devices under Test

Networking Device Testbed

TEST SYSTEM AND TEST METHOD FOR TIME-SENSITIVE NETWORKING DEVICE

RELATED APPLICATIONS

This application is a continuation-in-part (CIP) application claiming benefit of PCT/CN2022/073908 filed on Jan. 26, 2022, which claims priority to Chinese Patent Application No. 202110151950.4 filed on Feb. 3, 2021, the disclosures of which are incorporated herein in their entirety by reference.

FIELD OF THE INVENTION

This application relates to the field of testing technology for networking devices, and particularly to a test system and a test method for a time-sensitive networking device.

DESCRIPTION OF THE PRIOR ART

As the core for intelligent interconnection of industrial systems, industrial networks provide the foundation of industrial internet architectures and generally fall into two categories: industrial control networks and industrial information networks. Industrial network systems, through the collaboration of information and physical processes therein, are capable of production optimization, process simplification and effectiveness enhancement and therefore critical to rapid growth of the national economy and enhanced development of the digital, networked and intelligent industrial manufacturing. In conventional industrial networks for industrial control applications, a wide variety of field bus communication protocol standards and physical interfaces are being used. However, there is a lack of communication compatibility among the standards and of normalization among the physical interfaces. This greatly impedes the development of interconnectivity and interoperability of industrial networks.

In addition, standard Ethernet networks are non-deterministic in nature, in contrast to the requirements of industrial control applications for deterministic network transmission—a set of data packets must be delivered to a destination in an integral, real-time, deterministic manner. Therefore, standard Ethernet networks are not suitable for use in industrial applications that are demanding in the terms of determinism. This problem can be overcome by the time-sensitive network (TSN) standards provided by the IEEE TSN task group. In order to achieve latency minimization, the IEEE 802.1 TSN task group defines a variety of protocols such as 802.1 AS and 802.1 Qbv, which ensure deterministic and real-time transmission of data packets. Further, the TSN protocols standardize the MAC layer, avoiding the problem of fragmentation and incompatibility of individual industrial Ethernet protocols at the MAC layer.

In a word, as new-generation Ethernet technology, TSN is compatible with the standard Ethernet infrastructure, capable of accurate traffic scheduling, guarantees high-quality transmission of various types of traffic flows over the same network, and prevents both technical and cost advantages. Therefore, it has become one of the important directions for the evolution of new-generation industrial network bearer technology for many fields including A/V transmission, industrial, mobile bearers and in-vehicle network. To the evolution of TSN technology since its inception, the development and testing of TSN switches has been found to be most critical. Regarding the research and development of TSN switches, most of the advancements to date have been made by foreign manufacturers, for example, the NXP SJA1105TEL 5-port AVB/TSN automotive Ethernet switch, the Hirschmann RSPE35 and RSPE37 switches which have been software updated to support TSN, and the Intel SoC FPGA based TSN switches. However, there have been no achievements reported or published by any team in TSN testbeds and testing techniques. Designing a TSN testbed can provide users with a convenient testing environment, allow users to obtain desired performance parameters of a device under test at low time and economic cost, and guide manufacturing plants and companies in sensible selection, inspection and maintenance of equipment, providing increased economic benefits. Moreover, the current TSN standards are still in the process of formulation and improvement, and TSN testbeds can facilitate formulation of the standards by providing guidance. However, there are some challenges to the design of testbeds, such as a lack of particularity in the current standards, distinct implementations of manufacturers without much consistency, manual configuration needed in tests and unsatisfactory test efficiency. All these problems pose challenges to the development of TSN testbeds and testing techniques. It is an urgent need to design testing apparatuses, testbeds and testing methods for TSN networking devices, which are capable of assessing connectivity of a TSN networking device, supportability thereof for TSN standards, its networking performance metrics and the like and eventually returning test results.

It has been found in a search of the existing literature that there are no patents directed to TSN networking devices in the field of networking device testing. Patent Application No. 201811233569.7, entitled "Gateway Testbed", proposes a gateway testbed design, which interacts with individual network elements as indicated by instructions by performing pre-loaded, predefined test instances and thereby simulates a traffic communication process in a corresponding actual application of a gateway under test, thereby achieving automated traffic testing of the gateway under test. Patent Application No. 201920404568.8, entitled "Gateway Testing Device", is directed to a gateway testing device and elaborates the composition and assembly of various components of the gateway testing device, including a fixture, a plugging/unplugging means, a first clicking means, a second clicking means, an optical sensor and an information processing system. Patent Application No. 201310081724.9, entitled "IoT Gateway Testbed and Method", relates to an internet of things (IoT) gateway testbed including a traffic generator for mimicking the generation of various traffic models at a number of sensor nodes. This not only ensures validity and accuracy of tests, but also reduces the cost for deployment of a large test sensor network. Patent Application No. 201210512919.X, entitled "Testbed Method for Industrial Control Equipment", provides a testbed method for industrial control equipment. These patent applications focus on the improvement and innovation of testing methods for gateway testbeds, or on structural improvement and optimization of gateway testbeds. However, as the gateways that they deal with can only accommodate traditional Ethernet and other networks and do not support standards for conversion of TSN protocols, they are not suitable for use with TSN networks. Moreover, as most networking device testbeds do not have the ability to automatically generate simulation data, a test history cannot be used to guide test tasks. Most existing networking device testbeds only support the testing of a networking device, but cannot be based on the characteristics of industrial field data to provide a gateway configuration scheme that has been optimized in the terms of TSN scheduling performance. Moreover, most of them do not support testing according to protocols for industrial settings, such as EtherCAT over TSN, Powerlink over TSN, etc. Direct implementation of a conventional testing method on a production system is highly risky and will inevitably cause damage to the confidentiality, integrity and availability of the system under test. Therefore, there is a need for TSN network-oriented gateway testing apparatuses, testbeds and testing methods, which enable field or simulation tests over networking of multiple TSN networking devices.

Therefore, those skilled in the art are committed to developing a testing system and a testing method for a time-sensitive networking device, which are suitable for use in testing of TSN networking devices, allow a test history to be utilized to provide guidance to new test tasks, capable of formulating an optimal TSN gateway configuration scheme based on the characteristics of field data, provide an optional industrial protocol module and support cross-protocol interoperability testing.

SUMMARY OF THE INVENTION

In view of the above-described disadvantages of the prior art, the problem sought to be solved by this application is to address the problems associated with existing networking device testing systems of not being suitable for use with TSN networking devices, not having the ability to automatically generate simulation data, not allowing a test history to be utilized to provide guidance to test tasks, capable of formulating a gateway configuration scheme that has been optimized in the terms of TSN scheduling performance based on the characteristics of industrial field data and not supporting cross-industrial-protocol interoperability testing.

To this end, this application provides a test method for a time-sensitive networking device, comprising the steps as follows:

Step 1: Send a test request and a test goal from a user to an information processing device.

Step 2: Send test information from the information processing device to a conversion unit. The test information includes a protocol command, a test duration and a test command.

Step 3: At the conversion unit, receive the test information and send the protocol command to a signal generation unit, the test duration to a timing unit and the test command to a testing unit.

Step 4: At the signal generation unit, receive the protocol command, send a timer start signal to the timing unit and determine whether to send a test indication signal to a networking device under test according to a test scenario.

Step 5: At the networking device under test, receive corresponding data according to the test scenario and send feedback information to the testing unit.

Step 6: At the timing unit, receive the timer start signal, start a timer, send a timer end signal to the testing unit if the timer reaches the test duration, and otherwise, continue the timer.

Step 7: At the testing unit, receive the timer end signal and determine whether the networking device under test operates normally.

Step 8: At the testing unit, receive the test command and perform a test on the feedback information from the networking device under test according to the test command. The test includes at least one test goal. A test result is stored in the storage unit.

Step 9: After the testing unit completes the test, send the test result to the information processing device, which then generates a test report based on the test result and returns it to the user.

Further, the test request is a pulse signal, and a test process is initiated and the test goal is read at a high electrical level.

Further, the test goal comprises an interoperability test, a TSN standard supportability test, a networking performance metric test and a cross-industrial-protocol interoperability test.

Further, the interoperability test tests connectivity of a logical interface and a physical interface of the networking device under test.

Further, the TSN standard supportability test tests whether the networking device under test supports at least one of IEEE 802.1AS, IEEE 802.1Qbv and IEEE 802.1Qbu.

Further, the networking performance metric test comprises cycle time, latency, jitter, synchronization error, network load and communication capability.

Further, the cross-industrial-protocol interoperability test tests whether the networking device under test is compatible with data from different industrial protocols.

Further, the test information reflects the test goal of the user. The protocol command guides the signal generation unit to send a particular test indication instruction to the networking device under test according to the test request.

Further, the test duration indicates the timer's end time for the timing unit and helps the testing unit preliminarily determine whether the networking device under test is normally operable.

Further, the test command guides the testing unit to retrieve corresponding stored information for a test process from the storage unit. The test command carries a test flag so that a testing apparatus controls the test process based on the test flag.

Further, in step 4, when the test scenario is a simulation test, an automatic generation unit selects test data information from a test history, generates simulation data and sends the data to the signal generation unit. In response, the signal generation unit sends the test indication signal to the networking device under test based on the protocol command and the simulation data. The simulation data includes a data stream count, a frame length and a period.

Further, in step 4, when the test scenario is a field test, the test indication signal is not sent.

Further, in step 5, when the test scenario is the simulation test, the networking device under test receives the test indication signal, processes the test indication signal within the networking device itself and sends the feedback information to the testing unit.

Further, in step 5, when the test scenario is the field test, the networking device under test receives actual data from an industrial site, processes the data within the networking device itself and sends the feedback information to the testing unit.

Further, in step 7, if the feedback information is not received from the networking device under test within the test duration, then it is determined that the networking device under test operates abnormally, and a test result is generated.

Further, in step 7, if the feedback information is received from the networking device under test within the test duration, then it is determined that the networking device under test operates normally, and a request for retrieving stored information from the storage unit for subsequent testing is sent to the storage unit.

Further, in step 9, when the test environment is the simulation test, the signal generation unit generates the test indication signal with reference to industrial field data.

Further, in step 9, when the test environment is the field test, the test result contains an optimal configuration scheme for the TSN networking device using field data, which facilitates configuration of the networking device under test by the user.

Further, generation of the optimal configuration scheme includes: after the testing unit completes a test, generating a TSN configuration scheme for a network of the device under test; configuring the networking device under test according to the configuration scheme; processing industrial field data or simulation data according to a result of this configuration and obtaining a result of processing; returning the result of processing, performing a new test and generating a new TSN configuration scheme; repeating the feedback and iteration process multiple times until the optimal configuration scheme is reached.

This application further provides a test system for a time-sensitive networking device, which includes an information processing device and a testing device.

The information processing device is responsible for receiving a test request and a test goal from a user terminal, sending test information to the testing device, receiving a test result and providing them to the user terminal.

The testing device is responsible for testing a connected networking device under test and returning a test result.

The testing device includes a conversion unit, a signal generation unit, an automatic generation unit, a timing unit, a storage unit and a testing unit.

The conversion unit is responsible for receiving the test information and sending a protocol command to the signal generation unit, a test duration to the timing unit and a test command to the testing unit.

The signal generation unit is responsible for receiving the protocol command and sending a test indication signal to the networking device under test and a timer start signal to the timing unit.

The automatic generation unit is responsible for retrieving a test history from the storage unit, generating simulation data and sending the simulation data to the signal generation unit.

The timing unit is responsible for receiving the timer start signal, running a timer according to the test duration, sending a timer end signal to the testing unit upon expiry of the timer and providing the testing unit with a notice for starting the test.

The storage unit is responsible for storing TSN-related test guidance content for retrieval and use by the testing unit on demand.

The testing unit is responsible for receiving the test command from the conversion unit, the timer end signal from the timing unit and the feedback information from the networking device under test and testing the feedback information based on the TSN-related test guidance content retrieved from the storage unit.

Compared with the prior art, this application has the following prominent substantive features and profound advantages:

1. It can test multiple functions of a TSN networking device, promoting the development and commissioning of TSN networking devices.

2. It allows collection of historical test data, which can provide guidance to new tests. This can simplify and accelerate test processes and improve test accuracy.

3. It can provide an optimal configuration scheme for a TSN gateway based on the characteristics of field data.

4. It provides an optional industrial protocol module supporting interoperability testing of different industrial protocols.

Below, the concept, structural details and resulting technical effects of the present application will be further described with reference to the accompanying drawings to provide a full understanding of the objects, features and effects of the invention.

DETAILED DESCRIPTION OF THE PREFERRED EMBODIMENTS

Figure 1:
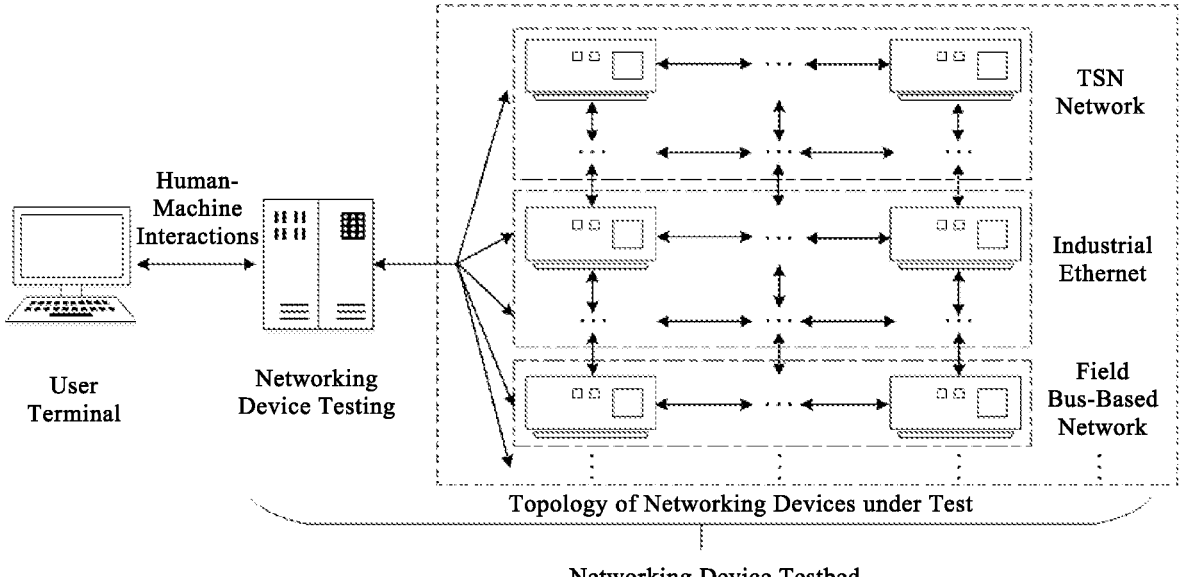
FIG. 1 is a physical wiring diagram of a preferred embodiment of the present application.

A few preferred embodiments of the present application will be described more fully hereinafter with reference to the accompanying drawings so that technical contents thereof will become more apparent and easier to understand. This application can be embodied in various different forms and its scope of protection is in no way limited to the several embodiments mentioned herein.

Throughout the figures, parts of the same structures are marked with the same reference numerals, and like elements with similar structures or functions are marked with like reference numerals. The dimensions and thickness of each component in the accompanying drawings are arbitrarily shown, and the present application is not limited to any particular dimensions and thickness of each component. Certain parts may be shown somewhat exaggerated in thickness in the interest of clarity.

FIG. 1 is a physical wiring diagram of a preferred embodiment of this application. One end of a networking device testing apparatus is connected to a user terminal, and the other end is connected to N networking devices under test.

Figure 2:
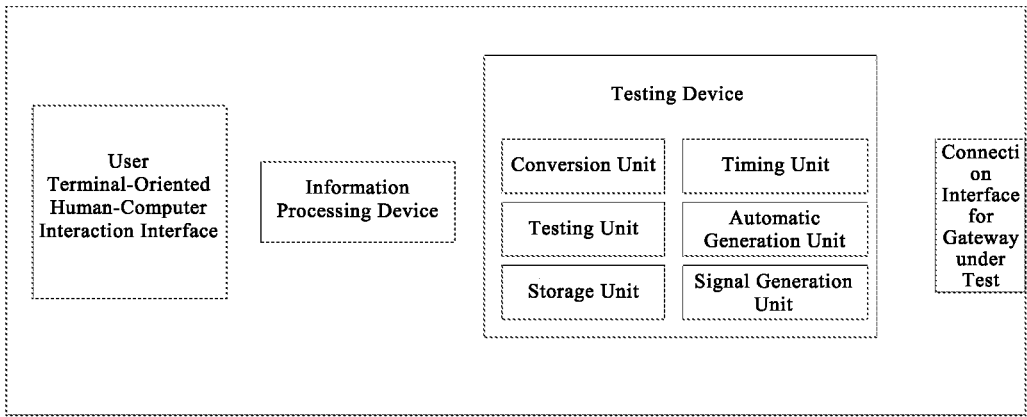
FIG. 2 is a schematic diagram showing the structure of a preferred embodiment of the present application.

FIG. 2 is a schematic diagram showing the structure of a preferred embodiment of this application. The networking device testing apparatus includes an information processing device and a testing device. The testing device includes a conversion unit, a signal generation unit, an automatic generation unit, a timing unit, a storage unit and a testing unit. The networking device testing apparatus is connected to the networking devices under test through a connection interface for a gateway under test.

The information processing device is responsible for receiving a test request and a test goal from the user terminal, sending test information to the testing device, receiving test results and providing them to the user terminal. The testing device is responsible for testing the connected networking devices under test and returning the test results.

The conversion unit is responsible for receiving the test information from the information processing device and sending a protocol command to the signal generation unit, a test duration to the timing unit, and a test command to the testing unit.

The signal generation unit is responsible for receiving the protocol command from the conversion unit and sending a timer start signal to the timing unit.

In case of a field test scenario, instead of sending the test indication signals, the networking devices under test receive actual data from an industrial site, process the data in themselves and send feedback information to the testing unit.

In case of a simulation test scenario, the automatic generation unit selects test data information from a test history, including the number of data streams, a frame length and a period, and sends it to the signal generation unit. In response, the signal generation unit, based on the protocol command and the test data information sent from the automatic generation unit, sends test indication signals to the networking devices under test. When receiving the test indication instructions, the networking devices under test process them in themselves and send feedback information to the testing unit. Since it is impossible to directly obtain industrial field data, the test indication signals are sent to the networking devices under test, which are then tested based thereon. The test indication signals are data streams simulating an actual industrial site generated with reference to the test data information. Among others, a period, a frame length and time-sensitive attributes of the data streams are determined by the test data information and reflect the user's test goal.

The timing unit is responsible for receiving the timer start signal from the signal generation unit, running a timer according to the test duration, sending a timer end signal to the testing unit upon expiry of the timer and providing the testing unit with a notice for starting the test.

Figure 3:
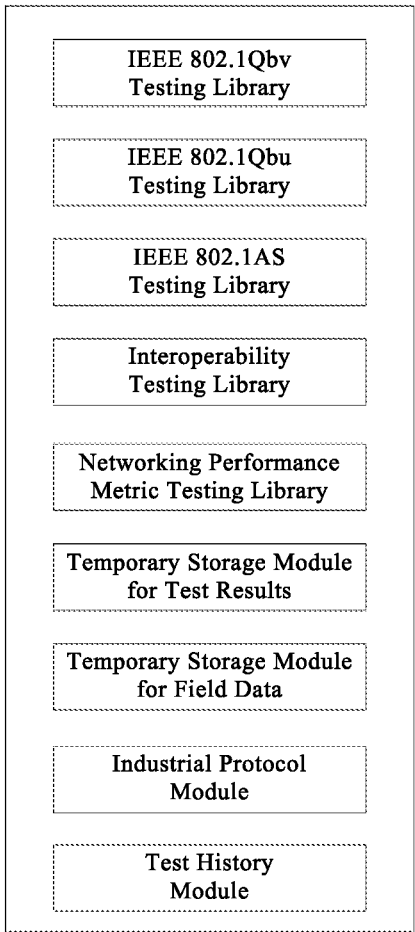
FIG. 3 schematically illustrates the composition of a storage unit according to a preferred embodiment of the present application.

The storage unit is responsible for storing TSN-related test guidance content for retrieval and use by the testing unit on demand. FIG. 3 schematically illustrates the composition of the storage unit.

The testing unit is responsible for receiving the test command from the conversion unit, the timer end signal from the timing unit and the feedback information from the networking devices under test and testing the feedback information based on the TSN-related test guidance content retrieved from the storage unit.

Figure 4:
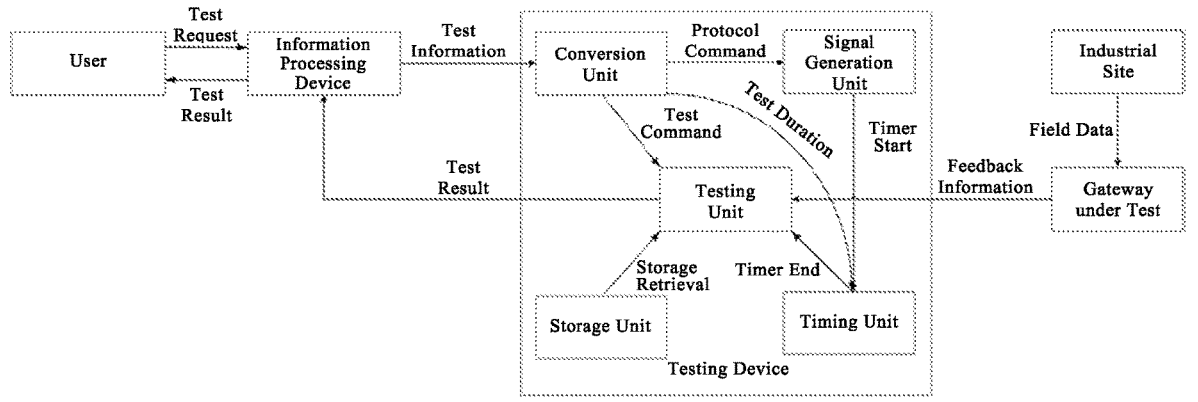
FIG. 4 is a schematic overview of a field test process according to a preferred embodiment of the present application.

FIG. 4 is a schematic overview of a field test process according to a preferred embodiment of the present application.

Figure 5:
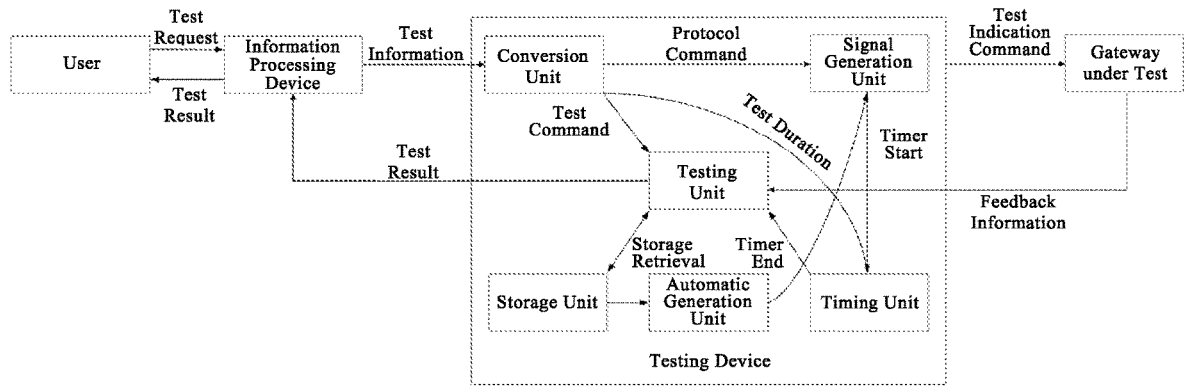
FIG. 5 is a schematic overview of a simulation test process according to a preferred embodiment of the present application.

FIG. 5 is a schematic overview of a simulation test process according to a preferred embodiment of the present application.

Figure 6:
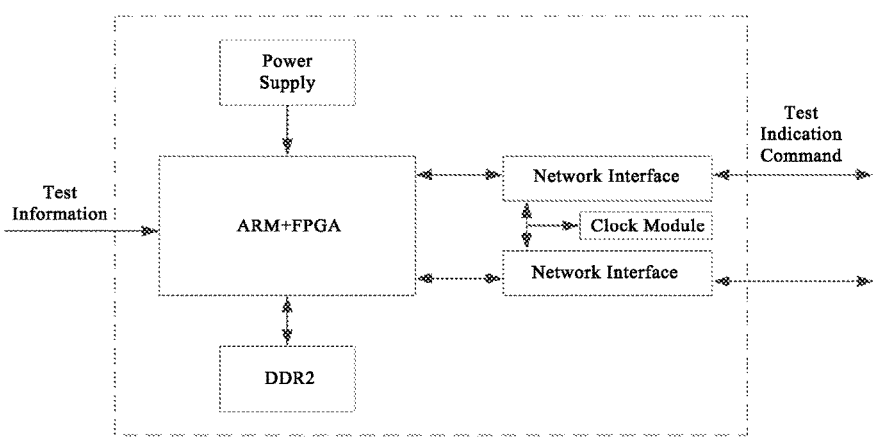
FIG. 6 schematically illustrates the physical composition of a preferred embodiment of the present application.

FIG. 6 schematically illustrates the physical composition of a networking device test apparatus according to a preferred embodiment of the present application, which includes an ARM+FPGA, a power supply, a DDR2, network interfaces and a clock module. The power supply provides power to the ARM+FPGA, and the DDR2 is connected to a data access terminal of the ARM+FPGA. An input terminal of the ARM+FPGA serves as an output terminal of the conversion unit, and output terminals of the network interfaces serve as output terminals of the signal generation unit. The clock module is connected to clock signal terminals of both the network interfaces.

Figure 7:
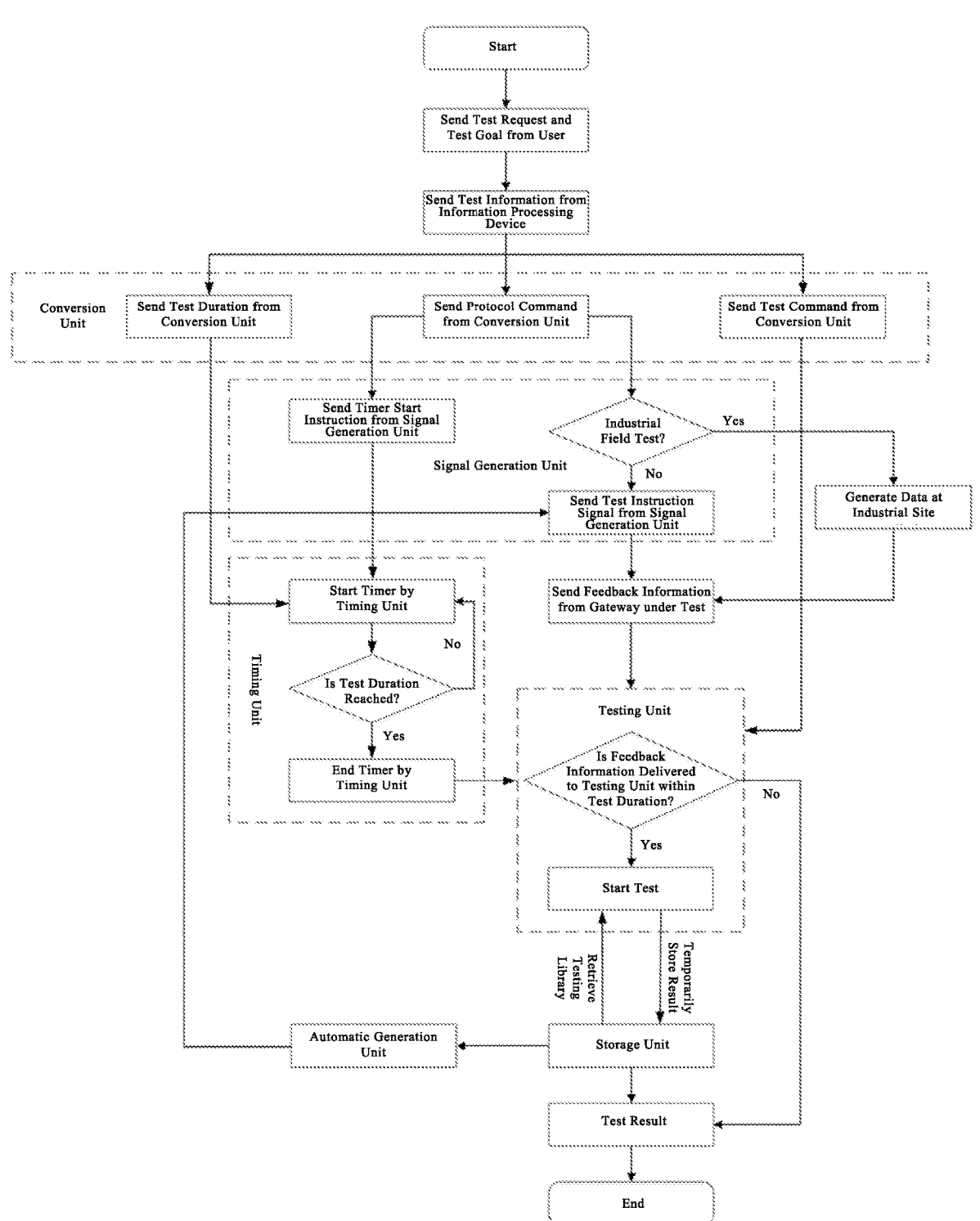
FIG. 7 is a flow diagram of a test procedure according to a preferred embodiment of the present application.

In this embodiment, the user desires to test connectivity and supportability for the TSN IEEE 802.1Qbv standard of the TSN networking devices, as well as their data latency and jitter as two networking performance metrics. It is assumed that initial data streams follow a Profibus protocol. As shown in FIG. 7, a test process includes the steps as follows:

Step 1: Connect the networking devices under test to the connection interface for the gateway under test in this embodiment with a high-level data link control (HDLG) link.

Figure 8:
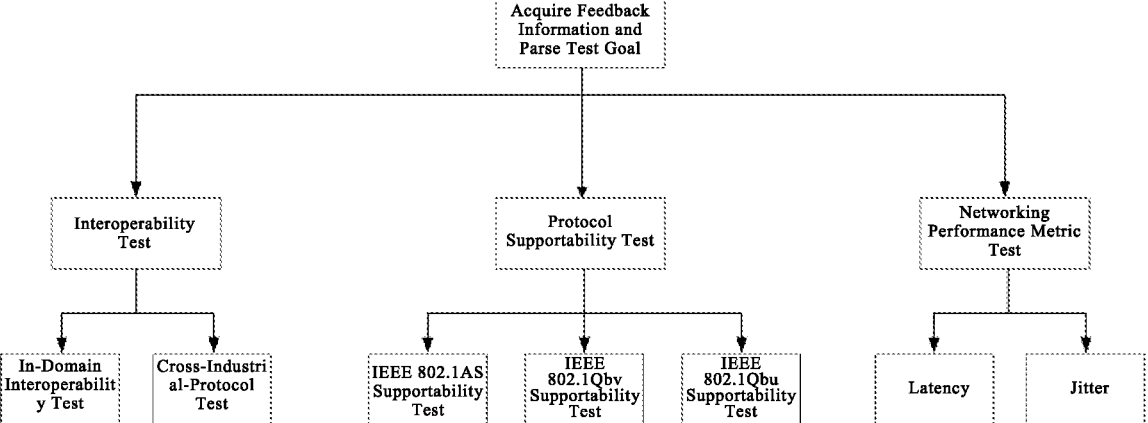
FIG. 8 schematically illustrates a test goal according to a preferred embodiment of the present application.

Step 2: Send a test request and a test goal by the user to the information processing device through a human-computer interaction interface. As shown in FIG. 8, the test goal includes the connectivity and supportability for the TSN IEEE 802.1Qbv standard of the TSN networking devices, as well as their data latency and jitter as two networking performance metrics.

Step 3: At the information processing device, receive the test request and the test goal from the user, parse the test goal, and send test information reflecting the test goal to the conversion unit. The test information includes a protocol command, a test duration and a test command.

Step 4: At the conversion unit, receive the test information and send the protocol command to the signal generation unit, the test duration to the timing unit and the test command to the testing unit. The protocol command requires the signal generation unit to produce data streams in compliance with the Profibus protocol, and the test command requires the testing unit to retrieve from the storage unit test guidance content regarding the connectivity and supportability for the TSN IEEE 802.1Qbv standard of the TSN networking devices, as well as their data latency and jitter as two networking performance metrics, for subsequent use for testing. The test duration t specifies a period to be timed by the timing unit.

Step 5: At the signal generation unit, receive the protocol command and send a timer start signal to the timing unit. In case of a simulation test scenario, the automatic generation unit selects suitable test data information from a test history, which includes the number of data streams, a frame length and a period, and sends it to the signal generation unit. The signal generation unit then sends, based on the protocol command, test indication signals in compliance with the Profibus protocol standard to the networking devices under test. In case of a field test scenario, no test indication signal is sent.

Step 6: At the networking devices under test, receive the test indication signal from the signal generation unit and send feedback information to the testing unit based on the test indication signal. The feedback information is TSN data streams obtained by subjecting the data streams in compliance with the Profibus protocol to protocol conversion and gate control list scheduling in the TSN networking devices. The timing unit receives the timer start signal and starts a timer. When the timer expires at the end of the test duration t sent from the conversion unit, the testing unit is notified of this.

Step 7: Upon the expiry of the test duration t, at the testing unit, receive a timer end signal from the timing unit and determine whether the feedback information is received from the networking devices under test before the test duration expires. If feedback information is not received from any networking device under test before the test duration expires, it is determined that the networking device is problematic, and test results are generated. If the feedback information is received from all the networking devices under test within the test duration, a request is sent to the storage unit for retrieving information stored therein for subsequent use for testing.

Step 8: At the testing unit, perform an interoperability test on the TSN networking devices and temporarily store test results in the storage unit. The testing unit also tests supportability of the TSN networking devices for TSN standards, in particular IEEE 802.1Qbv, and temporarily stores test results in the storage unit. The testing unit also tests networking performance metrics of the TSN networking devices, particularly their latency and jitter, and temporarily stores test results in the storage unit.

Step 9: At the testing unit, after the tests are completed, return a TSN configuration scheme to be optimized to the networking devices under test, receive processing results from the networking devices under test and update the configuration scheme. Multiple such feedback iterations are performed until an optimal configuration scheme is obtained.

Step 10: At the testing unit, read the temporarily stored test results from the storage unit and send the test results to the information processing device. The information processing device then produces a test report, which is displayed on the human-computer interaction interface for reading and use by the user.

Preferred specific embodiments of the present invention have been described in detail above. It is to be understood that, those of ordinary skill in the art can make various modifications and changes based on the concept of the present invention without exerting any creative effort. Accordingly, all the technical solutions that can be obtained by those skilled in the art by logical analysis, inference or limited experimentation in accordance with the concept of the present invention on the basis of the prior art are intended to fall within the protection scope as defined by the claims.

The invention claimed is:

1. A test method for a time-sensitive networking device, comprising steps of:

receiving a test request and a test goal sent from a user, wherein the test goal comprises an interoperability test, a time-sensitive network (TSN) standard supportability test, a networking performance metric test and a cross-industrial-protocol interoperability test; converting the test goal into test information comprising a protocol command, a test duration and a test command;

making a determination on a test scenario comprising a field test and a simulation test, wherein when the test scenario is the simulation test, a test indication signal is sent to a networking device under test; when the test scenario is the field test, the test indication signal is not sent to the networking device under test; and the test indication signal is a data stream simulating an industrial site generated with reference to test data information;

starting a timer according to the test duration, if a timed duration reaches the test duration, producing an end signal, and otherwise, continuing the timer;

when the timed duration reaches the test duration, determining whether feedback information is received from the networking device under test; wherein if the feedback information is not received, then the networking device under test is determined to be problematic, and a first test result is generated and stored; if the feedback information is received, the feedback information is tested, and a second test result is generated and stored; a test report is generated based on test result and returned to the user.

2. The test method for a time-sensitive networking device of claim 1, wherein the test request is a pulse signal, and a test process is initiated and the test goal is read at a high electrical level.

3. The test method for a time-sensitive networking device of claim 1, wherein the test indication signal is generated with reference to industrial field data.

4. The test method for a time-sensitive networking device of claim 1, wherein the interoperability test tests connectivity of a logical interface and a physical interface of the networking device under test.

5. The test method for a time-sensitive networking device of claim 1, wherein the TSN standard supportability test tests whether the networking device under test supports at least one of IEEE 802.1AS, IEEE 802.1Qbv and IEEE 802.1Qbu.

6. The test method for a time-sensitive networking device of claim 1, wherein the networking performance metric test comprises cycle time, latency, jitter, synchronization error, network load and communication capability.

7. The test method for a time-sensitive networking device of claim 1, wherein the cross-industrial-protocol interoperability test tests whether the networking device under test is compatible with data from different industrial protocols.

8. The test method for a time-sensitive networking device of claim 1, wherein the test information reflects the test goal.

9. The test method for a time-sensitive networking device of claim 1, wherein a data stream in compliance with a Profibus protocol is generated based on the protocol command.

10. The test method for a time-sensitive networking device of claim 1, wherein the test data information is retrieved and simulation data is generated based on the test command, and the test data information is selected from a test history.

11. The test method for a time-sensitive networking device of claim 10, wherein the test command carries a test flag, and a test process is controlled based on the test flag.

12. The test method for a time-sensitive networking device of claim 10, wherein the simulation data comprises a data stream count, a frame length and a period.

13. The test method for a time-sensitive networking device of claim 1, wherein when the test scenario is the simulation test, the networking device under test receives the test indication signal, processes the test indication signal and then sends the feedback information.

14. The test method for a time-sensitive networking device of claim 1, wherein when the test scenario is the field test, the networking device under test receives actual data from an industrial site, processes the actual data within the networking device itself and sends the feedback information.

15. The test method for a time-sensitive networking device of claim 1, wherein when the feedback information is received from the networking device under test, stored information is retrieved for subsequent testing.

16. The test method for a time-sensitive networking device of claim 1, wherein when the test scenario is the field test, the test result comprises a TSN networking device configuration scheme for field data, which facilitates configuration of the networking device under test by the user.

17. The test method for a time-sensitive networking device of claim 16, wherein generation of the configuration scheme comprises: after a test is completed, generating a TSN configuration scheme for a network of the device under test; configuring the networking device under test according to the configuration scheme; processing industrial field data or simulation data according to a result of this configuration and obtaining a result of processing; returning the result of processing, performing a new test and generating a new TSN configuration scheme; repeating such feedback and iteration process multiple times until the configuration scheme is reached.

18. A test system for a time-sensitive networking device, comprising a networking device testing apparatus, a user terminal and a plurality of networking devices under test, wherein one terminal of the networking device testing apparatus is connected to the user terminal, another terminal of the networking device testing apparatus is connected to the plurality of networking devices under test, and the networking devices under test compose a network topology;

wherein the networking device testing apparatus comprises a power supply, a processing unit, a storage unit, a network interface and a clock module, the power supply providing electric power to the networking device testing apparatus, the processing unit connected to the user terminal, the storage unit and the network interface, respectively, the network interface connected to the clock module, the network interface connected to the networking devices under test;

wherein the networking device testing apparatus is configured to perform the test method of claim 1.

19. The test system for a time-sensitive networking device of claim 18, wherein the processing unit comprises an advanced reduced instruction set computer (RISC) machine (ARM) and a field-programmable gate array (FPGA), and the storage unit comprises double data rate 2 (DDR2).

\* \* \* \* \*